Sept. 28, 1965

W. E. SEFFENS ETAL 3,209,296

ELECTRIC CORROSION TEST PROBE

Filed Jan. 8, 1960

INVENTORS:
W. E. SEFFENS
A. F. WIRTEL

BY *Sidney B. Ring*
ATTORNEY

Sept. 28, 1965     W. E. SEFFENS ETAL     3,209,296

ELECTRIC CORROSION TEST PROBE

Filed Jan. 8, 1960     2 Sheets-Sheet 2

INVENTORS:
W. E. SEFFENS
A. F. WIRTEL

BY *Sidney B Bing*
ATTORNEY

United States Patent Office 3,209,296
Patented Sept. 28, 1965

3,209,296
ELECTRIC CORROSION TEST PROBE
William E. Seffens, Webster Groves, and Arthur F. Wirtel, St. Louis, Mo., assignors to Petrolite Corporation, Wilmington, Del., a corporation of Delaware
Filed Jan. 8, 1960, Ser. No. 1,328
16 Claims. (Cl. 338—13)

This invention relates to corrosometry, and more particularly to a corrosion test probe and a corroding test specimen element designed so that the corroding test specimen element and the reference test specimen element or both can be easily replaced. More particularly, this invention relates to a corroding test probe containing a removable corroding test specimen comprising a probe mounting with at least one recessed aperture therein, for example, 1-4 or more, capable of electrical contact with a bridge measuring circuit, and a removable corroding test specimen with terminally insulated electrical contact means such as a plug, said insulated means being tightly inserted into such aperture so as to cause both electrical contact and a tight barrier against the corroding medium, such as by the use of jacks and circumferential means such as O-rings. Still more particularly, this invention relates to a probe containing such corroding test specimen elements containing plug-in elements which can be plugged into the body of the probe in a manner so as to insure a tight seal, such as into a jack. In this specification and claims the removable feature of this invention applies with equal force to both the corroding test specimen as well as the reference test element.

A recent advance in corrosometry involves an electrical resistance method whereby the rate of corrosion is determined by correlating the change in electrical conductivity with the change in cross-sectional area of a corroding metal.

In the electrical resistance technique the corroding test specimen element is a strip, a wire, a tube, etc., of the test metal. The electrical resistance of the specimen is measured. When the specimen corrodes it becomes thinner and its electrical resistance increases. From this increase it is possible to calculate the loss of metal from corrosion. The instrument employed in such measurements comprises a probe, which is placed in the corrosive medium, connected to an electrical resistance change meter generally equipped with a bridge measuring circuit which employs resistance bridges and functions like an analogue computer to indicate the changes quantitatively. By means of such an instrument corrosion can be measured under actual service conditions whereby advantage is taken of the heterogeneity of the corrosive environment. The corroding test specimen does not have to be taken out or upset in any way and any number of measurements can be taken as often as desired. The sensitivity of measurement is high since the instrument can record corrosion in terms of a fraction of a microinch of penetration. In practice, the resistance of the exposed specimen is compared with the resistance of a coated specimen made of the same specimen which is used as a reference.

These types of corrosometers are described in the following Patents: 2,888,642, 2,824,283, 2,830,265, 2,869,003, 2,735,754 and others.

In preparing the probe, it is necessary to compromise between the sensitivity and the life span of the corrosive specimen. To assure long life, thick specimens are desirable. However, thin specimens give greatest sensitivity to small changes in cross-section. Moreover, it would be highly desirable to have a probe, in which the specimen can be easily replaced without affecting the rest of the probe, which can be reused. Since the test specimen is the least expensive part of the probe, great cost savings would be experienced if the body of the probe could be used time and again. However, in preparing retractable test specimens it is difficult to effect a seal between the retractable specimen and the main body of the probe so as to prevent the entrance of the corroding medium thereinto, particularly under high pressure and temperature.

We have now discovered a simple, inexpensive corroding test specimen element (and reference element) which can be inserted into the body of the probe so as to form a tight seal therein, thus providing: (1) a corrosion test probe which can be used with an electrical resistance measuring apparatus adapted to determine corrosivity such as a bridge measuring circuit; (2) a new form of corrosion test probe which has a novel means for holding the corroding test specimen element; (3) a corrosion test probe adapted for reuse with various corroding test specimen elements which can be fabricated easily and inexpensively; (4) a means of using any size or shape of corroding test specimen element.

The advantages of this invention will become apparent from the description herein given.

The invention is best described by reference to the attached drawings in which:

FIGURE 1 is a side view of an assembled probe which employs four separate plugs in four apertures.
FIGURE 2 is vertical cross-section view of the embodiment shown in FIGURE 1.
FIGURE 3 is a top-end view of FIGURE 1.
FIGURE 4 is a side view of the corroding test element containing insulated plug-in elements.
FIGURE 5 is an exploded vertical cross-section view of one plug inserted in FIGURE 2.
FIGURE 6 is a side view of another assembled probe which employs one plug in one aperture.
FIGURE 7 is a vertical cross-section of FIGURE 6.
FIGURE 8 is a top-end view of FIGURE 6.
FIGURE 9 is the side view of the corroding test specimen element containing insulated plug and elements employed in FIGURE 6.
FIGURE 10 is the side view of the O-rings employed.
FIGURE 11 is an exploded vertical cross-section view of the plug inserted in FIGURE 6.

In the drawings the unit performing the same function will receive the same number in all cases.

Referring to the drawing in FIGURE 1, 1 represents the corroding test specimen and 1R the coated reference element. 2, of which only the top lip is visible, represents the terminally insulated electrical contact means or plug in which the corroding element is embedded. This insulated plug is inserted into an aperture in the main body of the probe 3, which body contains externally threaded ends. The upper thread can be screwed into the system under investigation. A protection cap can be screwed over the lower thread.

FIGURE 2, in vertical cross section, shows the plug inserted in the main body of the probe device. However, to securely seal the plug into the main body of the probe, there is placed around the plug a circumferential sealing means, such as O-ring 5. The inserted plug rests on a circumferential collar 6. The electrical contact element of the corroding element 4 is inserted into the connection drive fit or jack 7. 8 represents means by which electrical contact is maintained between the measuring device and the corroding element through lead wires. 10 represents the electrical contact of the jacks which is connected with the lead wire.

FIGURE 3 represents a top edge view of FIGURE 1 which contains, set in the main body of the probe, elements represented in FIGURE 4, one of these, 1, is the corroding and the other, 1R, the coated reference element. In FIGURE 3 only the upper lips of the plugs in the corroding element are visible when the plug, shown in FIGURE 4, is inserted in the main body of the probe. Electrical contact is made by means of 4 which is in electrical connection with the corroding wire.

When the plugs are inserted into the apertures therefor in the main body of the probe, and a vertical cross-section is taken, it appears as shown in FIGURE 5, in which 2 is the plug which is made of an electrical insulating material, for example a Bakelite resin and 9 is the inner section of the plug in which the corroding wire is embedded, for example, an epoxy resin. To insure a tight seal from the corroding medium one employs a circumferential sealing means or O-rings for example, made of neoprene rubber, represented by 5 and a collar 6 are employed. To obtain good electrical connection, a connector drive-fit or jack 7 is used into which the electrical connection of the plug is inserted. Electrical connection to the measuring instrument is maintained by means of lead wire 10 connected to the jack which is also connected to the measuring instrument through the means shown by 8.

FIGURES 6–11 differ from the type illustrated in FIGURES 1 through 5 in that one plug contains both corroding test specimen and reference element in contrast to FIGURES 1 through 5 wherein four plugs are employed. However, the same principles apply as before.

In FIGURE 6, 1 refers to the corroding test element and 1R to the reference elements inserted in the body of the probe 3 which is threaded as before.

FIGURE 7 is a cross-section of FIGURE 6 in which 1 and 1R refer to the corroding and reference elements. 2 refers to the plug, 5 refers to the O-ring, 6 refers to the collar, 3 refers to the main body of the probe, and 10 refers to the lead wires which are in electrical contact with the jack and the plug 8.

Figure 3:
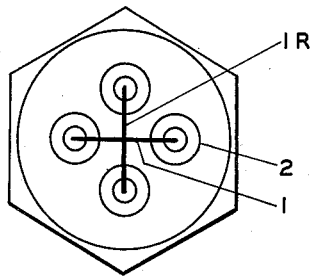
Figure 4:
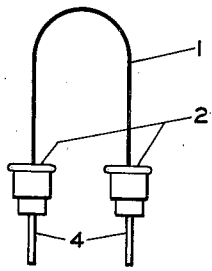
Figure 1:
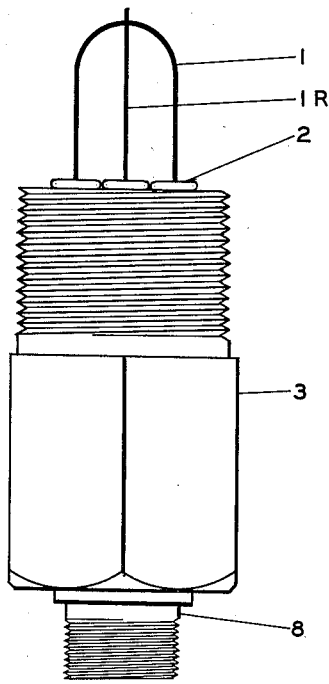
Figure 5:
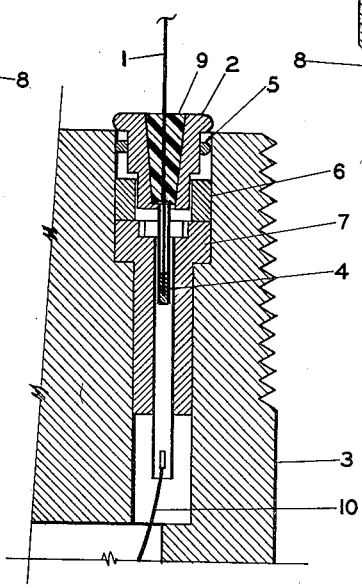
Figure 2:
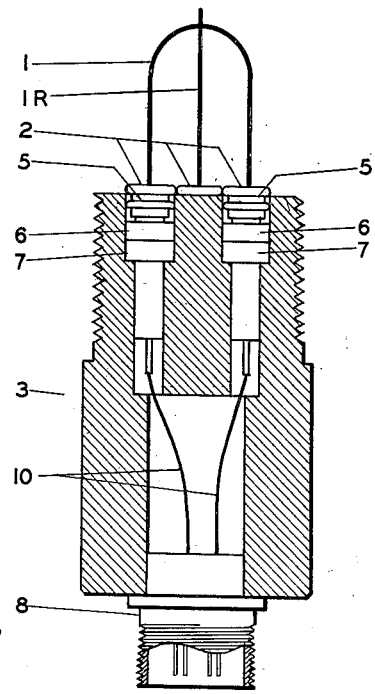
Figure 8:
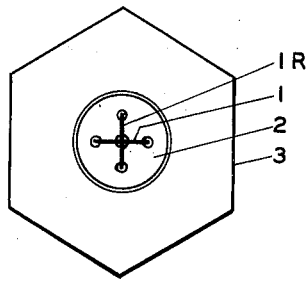
FIGURE 8 is a top view of the probe in which 1 and 1R refer to the corroding and reference wires and 2 refers to the plug.
Figures 9, 10:
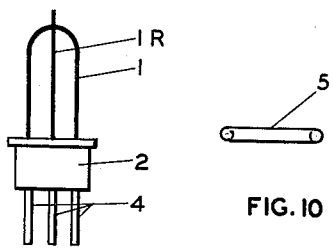
FIGURE 9 is a plug 2 containing both the corroding test and the reference elements. In contrast, to FIGURES 1–5 wherein four separate plugs are employed, this embodiment employs one plug for the four contacts.
FIGURE 10 is a cross-section of O-ring 5.
Figure 6:
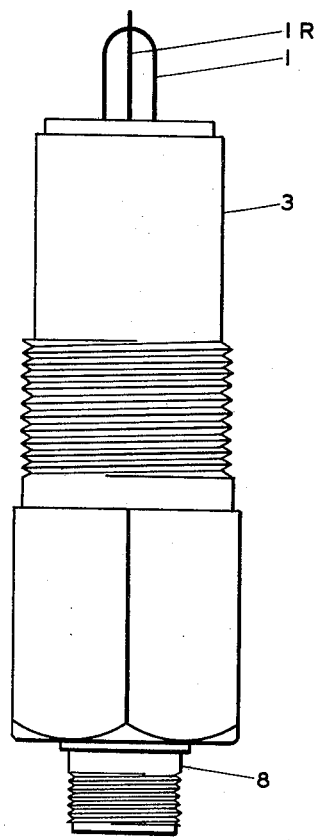
Figure 11:
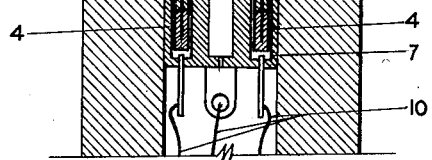
Figure 7:
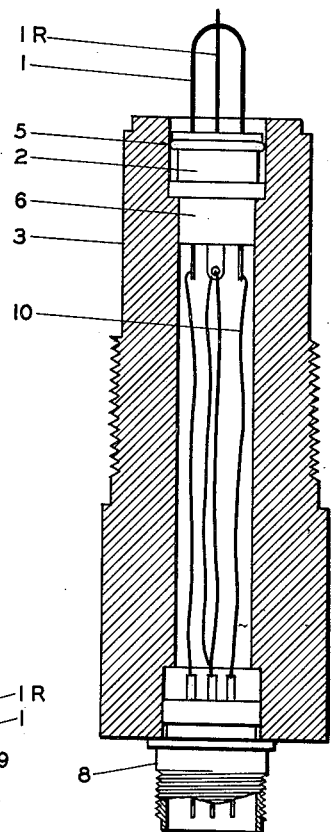

FIGURE 11 is an exploded cross-section view of FIGURE 6 in which 1 and 1R refer to the corroding and reference elements, 2 refers to the plug, here made of Bakelite resin, 9 refers to the material in which the corroding and reference elements are embedded, here epoxy resin, 5 refers to the O-ring, 4 refers to the electric contacts of the corrosion element where it is inserted into the jack 7 which is in electrical contact with the lead wires 10.

In summary, in these embodiments there is a main body of the probe containing a recessed aperture into which an electrically insulated plug or plugs containing corroding elements are inserted. Insertion is essentially a plug and jack effect. A tight seal is maintained by means of O-rings and a collar. Electrical connection is made between the corroding element and the measuring device by means of the lead wire connected to an electric plug to which the measuring device is connected.

The essence of the present invention is a simple, inexpensive replaceable corroding test element which can be tightly inserted into the body of the probe. If a tight seal is not maintained the corroding liquid will enter the main body of the probe device and cause damage therein.

The various component parts of the test probe as described may be made of any materials of construction and are preferably made of metal or metal alloys that are resistant to the corrosive action of the environment in which the unit is used. The plugs and O rings used in the test probe, which are subjected to elevated temperatures, should be constructed of such insulating and sealing material available that is resistant to corrosion and has good electrical properties. Suitable materials include rubber, Bakelite, Lucite, Teflon, paper and fabric laminates such as the phenolic and epoxy resin, laminates where the maximum operating temperature of the test probe does not exceed about 250° F. These materials, described in "Materials and Methods," vol. 42, No. 1, July 1955, exhibit good metal bonding strength, flexing strength, and arc resistance, and are of low cost. The maximum temperature at which these materials may be joined is about 400° to 450° F. with a time of heating not more than about 5 seconds. The maximum operating temperatures for glass fiber laminates are: melamine, 260° F.; Teflon 300° F.+, and epoxy 250° F.+, but the binding temperatures are higher and the dimension stability is improved over paper and fabric laminates. Phenolic nylon fabric laminates would have only limited application, since the maximum operating temperature during fabrication or use is only about 165° F. Ceramic insulators such as titanite, steatite, glass bonded mica, and glass bonded synthetic mica withstand high temperatures and high frequencies. The latter-named mica materials can be used or fabricated at temperatures as high as 650° to 750° F.

The protected element which is used as a reference (1R) is coated or protected by a thin layer of a protective coating having good insulating and corrosion resisting properties. Suitable examples of such materials include such proprietary compounds as Tygon paint (American Chemical Paint Co., Ambler, Pa.) Armstrong A–2 adhesive; Carbolene Phenoline 300; Scotchcast Resin–MMM; Sauereisen cement, which is desirable for high temperature applications; fluorinated ethylene polymers such as Kel–F, Teflon, polyethylene (these would have to be flame-sprayed); or any corrosion-resistant, relatively non-conducting coating. These and other plastic materials of construction are described in detail in "Modern Plastics Encyclopedia," published by Plastics Catalogue Corp. of Bristol, Connecticut. The Plastics Properties Chart accompanying this publication gives the physical, chemical, electrical, molding and other properties of numerous plastics, and their trade names, that may be used.

The coating should be of sufficient thickness to provide complete protection to the coated resistance element both during the test life of the corrosion testing unit or probe and during handling or storage. The coating may be applied by spraying, dipping, brushing, etc., amenable to the particular coating chosen.

The test specimens, both corroding and reference, should have substantially the same resistivity, which means they will have substantially the same chemical composition. This is necessary in order that the bridge measuring circuit, which is connected to the test probes through 8 may be made to function accurately without tedious calibration. However, it is unnecessary that the configuration or total resistance of the protected and unprotected test specimens be identical. Because the corrosion-measuring process with which the test probe of this invention is used utilizes a comparison method for determining the change in resistance of the unprotected test specimen or resistance element which exposed to corrosive conditions, the bridge circuit in which the test probe is installed during use is initially balanced by adjusting the ratio of the resistance elements.

The test specimens may be any shape. The test specimens may be fabricated from one piece of the material of construction under consideration. Before use or when new, the test specimens have substantially the same electrical resistivity and chemical composition. Advantages accrue in constructing the test specimens or elements from materials having the same resistance values. However, suitable unsymmetrical corrosion testing elements can be fashioned in accordance with this invention in which the resistances of these elements are not identical, provided, for the sake of consistency, a material of construction is employed which is substantially uniform in composition and resistivity. The ratio of the resistance of the unprotected test specimen to the resistance of the protected test specimen, expressed as $$\frac{R \text{ unprotected}}{R \text{ protected}}$$

may vary from values of about 0.1 to 10. When a corrosion test element combination is fabricated from test specimens having different resistances within the above ratios, corresponding changes in the values of the resistances of the other branches of the bridge circuit will have to be made. Although theoretically, the above ratios of resistances could vary over wide limits, as a practical matter there are mechanical and electrical factors which have to be taken into consideration in the design of a suitable corrosion testing unit or probe. Lead resistance, for example, will be appreciable if a small corrosion testing probe is used in which the resistance of one element is only about a tenth or less of the resistance of the other element. This factor is not pronounced in the case of large, unsymmetrical test elements in which the resistance of even the smaller one is large compared with the lead resistance. Lead resistance can be substantially eliminated by the manner of interconnecting the corrosion testing unit with the bridge circuit. Mechanical considerations include making the test probe unit large enough for easy assembly and attachment of the lead wires, and to offset an unbalance in temperature compensation.

From this description it is seen that the invention is necessarily confined to test specimens having the property of conducting electricity and showing a change in resistance proportional to changes in cross-sectional area due to corrosion. The materials of construction that meet these requirements include all metals and metal alloys such as steel, iron, bronze, brass, copper and the like. The environment to be investigated by the test elements or the completed test probes of this invention may be in any physical state or may exist as a mixture of substances in different physical states. The corrosive environment may be gaseous, vaporous, solid, or semi-solid, or a mixture of these forms of matter. Examples include corrosive liquid and gases, such as the halogens, acid or base solutions, flue gases, and mixtures of gases or carrier liquids containing a high content of solids, such as catalyst particles. These environments may be considered to be corrosive because of their chemical effects and erosive because of their mechanical effects on the metal surfaces which result in disintegration thereof or loss of portions of the exposed test specimen. Examples of corrosive liquid environment would be petroleum fluids, such as oil field brines, refinery streams, water flooding operations, oil products, etc., an ammonia-ammonium nitrate fertilizer solution and the like.

Since the test probe of this invention is designed for use at relatively high pressures and temperatures, care should be exercised in the selection of the materials of construction for the base member and associate parts. The thread and gasket-sealing surfaces should be carefully prepared so as to be without roughness or flaws. Thread-sealing compounds may be used on the threaded surfaces to insure against leaks.

Having thus described my invention, what we claim as new and desire to obtain by Letters Patent, is:

1. A corrosion test probe, comprising, in combination, a probe mounting having at least one recessed aperture therein, terminally insulated electrical contact means removably and tightly positioned in said recessed aperture, a corroding test specimen fixedly positioned in and electrically connected to said terminally insulated electrical contact means, said terminally insulated electrical contact means and said corroding test specimen fixedly positioned therein constituting at least a portion of a removable corroding test specimen element, means for sealing said terminally insulated electrical contact means having said corroding test specimen fixedly positioned therein and electrically connected thereto tightly against the corroding medium, said sealing means being positioned in said recessed aperture, and means positioned in said recessed aperture only for electrically connecting said electrical contact means and said corroding test specimen element electrically connected thereto with a resistance measuring apparatus, whereby said corroding test specimen can be easily replaced.

2. The corrosion test probe of claim 1 wherein said terminally insulated electrical contact means removably and tightly positioned in said recessed aperture is a plug and said means for electrically connecting said corroding test specimen element and said electrical contact means electrically connected thereto with a resistance measuring apparatus is a jack in which said plug is received.

3. The corrosion test probe of claim 2 wherein said sealing means is a circumferential sealing means positioned in said aperture between said plug and the aperture wall.

4. The corrosion test probe of claim 3 including a circumferential collar positioned in said recessed aperture, said plug being seated on said collar.

5. A corrosion test probe, comprising, in combination, a probe member having four recessed apertures therein, a terminally insulated electrical contact means removably and tightly positioned in each of said recessed apertures, a corroding test specimen fixedly positioned in and electrically connected to a terminally insulated electrical contact means at two separate portions thereof, whereby said corroding test specimen contains two terminally insulated electrical contact means, said two terminally insulated electrical contact means and said corroding test specimen fixedly positioned therein constituting a removable corroding test specimen element, a reference specimen fixedly positioned in and electrically connected to a terminally insulated electrical contact means at two separate portions thereof, whereby said reference specimen contains two terminally insulated electrical contact means, said two terminally insulated electrical contact means and said reference specimen fixedly positioned therein constituting a reference specimen element, means for sealing each terminally insulated electrical contact means having a portion of said specimen fixedly positioned therein and electrically connected thereto against the corroding medium, said sealing means being positioned in its respective recessed aperture, and means positioned in each of said recessed apertures only for electrically connecting each of said electrical contact means and said corroding test specimen element and said electrical contact means and said reference specimen element with a resistance measuring apparatus, whereby each of said corroding test specimen and said reference specimen can be easily replaced.

6. The corrosion test probe of claim 5 wherein each of said terminally insulated electrical contact means removably and tightly positioned in its recessed aperture is a plug and each of said means for electrically connecting each of said corroding test specimen element and said electrical contact means electrically connected thereto and said reference specimen element and said electrical contact means electrically connected thereto with a resistance measuring apparatus is a jack in which said plug is received.

7. The corrosion test probe of claim 6 wherein said sealing means is a circumferential sealing means positioned in the respective aperture between said plug therein and the aperture wall.

8. The corrosion test probe of claim 7 including a circumferential collar positioned in each of said recessed apertures, the plug in each aperture being seated on said collar.

9. A corrosion test probe, comprising, in combination, a probe mounting having one recessed aperture therein, terminally insulated electrical contact means removably and tightly positioned in said recessed aperture, a corroding test specimen fixedly positioned in and electrically connected to said terminally insulated electrical contact means at two separate portions thereof and a reference specimen fixedly positioned in and electrically connected to said terminally insulated electrical contact means at two separate portions thereof, said terminally insulated electrical contact means and said corroding test specimen and said reference test specimen constituting a removable test specimen element, means for sealing said terminally insulated electrical contact means tightly against the corroding medium, said sealing means being positioned in said recessed aperture, and means positioned in said recessed aperture only for electrically connecting each of said electrical contact means and said corroding test specimen element electrically connected thereto and said reference specimen element electrically connected thereto with a resistance measuring apparatus, whereby said corroding test specimen and said reference specimen can be easily simultaneously replaced.

10. The corrosion test probe of claim 9 wherein said terminally insulated electrical contact means is a plug and said means for electrically connecting each of said corroding test specimen element and said reference specimen element and said electrical contact means electrically connected thereto with a resistance measuring apparatus contains jacks for receiving the respective elements.

11. The corrosion test probe of claim 10 wherein said sealing means is a circumferential sealing means positioned in the aperture between said plug therein and the aperture wall.

12. The corrosion test probe of claim 11 including a circumferential collar positioned in said recessed aperture, said plug being seated on said collar.

13. An easily removable corroding test specimen element comprising, in combination, a corroding test specimen and terminally insulating electrical contact means for tight insertion into and easily removable from a recessed aperture only of a corrosion test probe mounting, said corroding test specimen being fixedly positioned in and electrically connected to said terminally insulating electrical contact means.

14. The corroding test specimen element of claim 13 in which the insulating means is a plug adapted for a jack.

15. The corroding test specimen element of claim 14 in which two separate plugs are present on each corroding test specimen.

16. The corroding test specimen element of claim 14 in which one plug contains the ends of the corroding test specimen element.

References Cited by the Examiner

UNITED STATES PATENTS

| | | | |
|---|---|---|---|
| 2,594,921 | 4/52 | Hansard | 338—22 X |
| 2,735,754 | 2/56 | Dravnieks | 338—13 X |
| 2,754,378 | 7/56 | Ohlheiser | 338—35 |
| 2,864,252 | 12/58 | Schaschl | 324—30.2 X |
| 2,864,925 | 12/58 | Ellison | 324—71.3 X |
| 2,869,003 | 1/59 | Marsh et al. | 324—71.3 X |
| 2,878,354 | 3/59 | Ellison | 338—13 |
| 2,993,366 | 7/61 | Birkness | 324—71.3 |

RICHARD M. WOOD, *Primary Examiner.*

ANTHONY BARTIS, LLOYD McCOLLUM, FREDERICK M. STRADER, *Examiners.*